United States Patent [19]
Karasa et al.

[11] 4,032,160
[45] June 28, 1977

[54] CHUCK KEY HOLDER

[75] Inventors: Alvydas Petras Karasa, Belair; Stanley Alan Markle, Lutherville, both of Md.

[73] Assignee: The Black and Decker Manufacturing Company, Towson, Md.

[22] Filed: Sept. 20, 1974

[21] Appl. No.: 508,009

[52] U.S. Cl. .............................. 279/1 K; 81/90 A; 403/349; 408/241 R

[51] Int. Cl.[2] ..................... B25B 13/44; F16D 1/06

[58] Field of Search ............... 279/1 K; 408/241 R; 81/90 A; 206/349, 376, 377; 85/5 P; 211/60 T, 69; 403/353, 348, 349; 24/221 A, 221 K

[56] References Cited

UNITED STATES PATENTS

| 1,577,193 | 3/1926 | Reed | 85/5 P |
|---|---|---|---|
| 1,586,904 | 6/1926 | Kuhn | 85/5 P |
| 1,647,396 | 11/1927 | Decker | 279/1 K |
| 1,798,234 | 3/1931 | Toppin | 81/90 A |
| 1,821,436 | 9/1931 | Holloway | 279/1 K |
| 2,601,213 | 6/1952 | Poupitch | 24/221 K X |
| 2,855,036 | 10/1958 | Zarnowski | 403/353 X |
| 3,348,432 | 10/1967 | Kietfer | 408/291 |
| 3,963,361 | 6/1976 | Schenk | 403/349 X |

FOREIGN PATENTS OR APPLICATIONS 742,916   10/1943   Germany ......................... 403/349

Primary Examiner—Othell M. Simpson
Assistant Examiner—Z. R. Bilinsky
Attorney, Agent, or Firm—William Kovensky; Joseph R. Slotnik; Walter Ottesen

[57] ABSTRACT

An improved chuck key and spring pocket for holding the key. The key comprises a sliding cross bar having paddle ends, and the spring pocket cooperates with this cross bar. The pocket opening accepts the key in one orientation only, and then the paddles are used to cam the key tightly into the pocket.

24 Claims, 10 Drawing Figures

CHUCK KEY HOLDER

This invention pertains to an improved chuck key and holder or pocket for the chuck key, or for a like member.

More specifically, as is very well known, the chuck key, which is required for use with drills, drill presses, and the like, has always presented annoying problems due to their being small separate pieces and often getting lost. One solution is to attach the chuck key to the power cord of portable electic tools. This solution suffers from the disadvantage that it is somewhat inconvenient to double the cord up on itself in order to get the key into the chuck, that is, the cord sometimes gets in the user's way when he attempts to use the chuck key. Similar solutions, often used in stationary installations as in drill presses, is to attach the chuck key to the tool by a chain or the like. This solution suffers from the disadvantage that it presents somewhat of a hazard in that the key could get entwined in the spinning drill, or the work, or both, and, again as in portable corded tools, the chain or cord itself sometimes get in the user's way. With the advent of portable cordless battery powered tools, this solution of attaching the key to the power cord has become impossible.

Many prior solutions attached clips of various kinds to the tool into which the key was positioned when not in use. Other solutions use the key clip means in or on the tool as a safety interlock. That is, various means were provided whereby the tool would not operate unless the key was stowed in a predetermined manner in its holder in the tool. While not so shown in the drawings, the invention does lend itself to this kind of an installaion, as is clear to those skilled in these arts. The present invention is of this general class, that is, it provides a pocket of a particular sort into which the chuck key is stowed when not in use. The invention resides in the combination of the mating key and its pocket, and in the pocket itself.

The key is of the more or less familar T-bar configuration, however, the T-bar is made movable in an enlarged opening in the shank of the key. The ends of the cross bar are swaged in a simple manufacturing operation to form paddles. These paddles ends serve to constrain the bar in the enlarged opening, and serve to cooperate with the spring means in the pocket to hold the key in the pocket. At the same time, the improved cooperating means between the spring means of the pocket and the key permit very simple locking and unlocking and insertion and removal of the key from and to the pocket. The paddle ends on the movable cross bar of the key serve the additional purpose of, in cooperation with other means in the specially formed pocket and on the key itself, to cam the key and pocket together to form a rigid assembly, whereby the key is firmly held in place in the pocket and on the tool or other means containing the pocket.

The pocket itself may advantageously comprise a simple cast-in cavity in a tool base, portable tool handle, or other convenient location, into which is fitted suitable spring means. As an alternative feature, other means may be provided in the pocket to cooperate with the inside paddle end of the cross bar to define a stop against which that paddle end may rest in the locked position, to thereby define the locked position.

The invention was designed for and is intended primarily for use with drills and other power tools, both stationary and portable, and both corded and cordless, having chucks requiring chuck keys. In a stationary tool, such as a drill press, it would be a mundane matter to provide a pocket in accordance with the invention at a convenient location, such as in the base, for stowage of the specially formed key. However, the invention is not so limited, and may be used to stow other objects which are periodically used and which tend to be lost. For example, the invention could be advantageously used to hold down any sort of lid, such as ports or scuttles aboard ships; or to hold the adjusting tool required for ski bindings; or as a key to actuate an electrical switch in a host of environments; or generally to stow small objects or tools occassionally, needed in conjunction with many types of mechanisms or devices.

The above and other advantages of the invention will be pointed out or will become evident in the following detailed description and claims and in the accompanying drawing also forming a part of this disclosure in which FIG. 1 is a side elevational view of a cordless battery operated drill including the invention;

Figure 1:
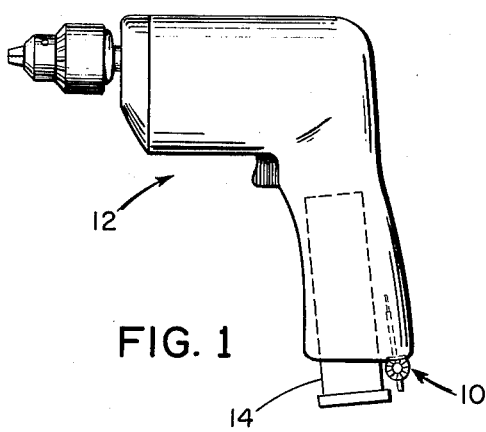
Figure 2:
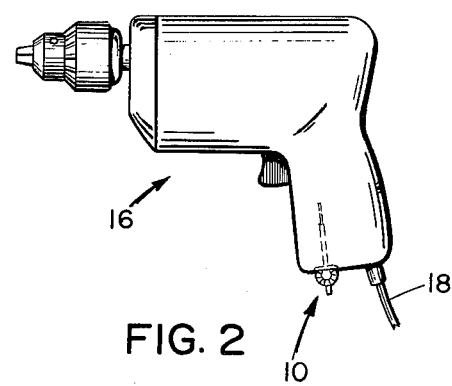
FIG. 2 is a similar view of a corded drill.

Referring now in detail to the drawing, a cordless battery driven drill 12 having a battery pack 14 is shown in FIG. 1. The chuck key 10 is mounted in the butt of this drill. FIG. 2 shows a drill 16 having a conventional power cord, and also having the key 10 in the butt thereof. Both FIGS. 1 and 2 are stylized representations of the broad environment in which the invention could be used. This environment includes stationary installations such as drill presses, portable drills of all sizes, and other tools requiring chuck keys, or the like, small hand tools such as shears, jigsaws which require a hex type wrench, and routers.

Figure 3:
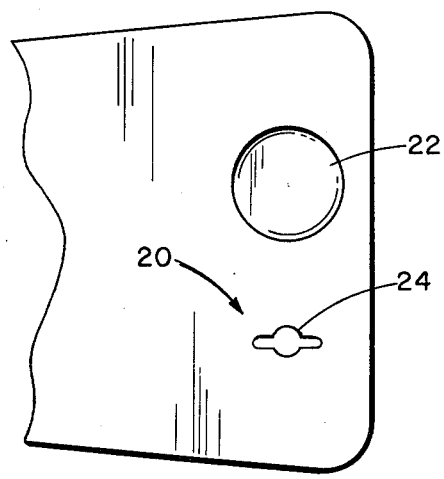
FIG. 3 is a plan view of the outside of a pocket as it might by formed in one of the drills of FIGS. 1 and 2.
Figure 4:
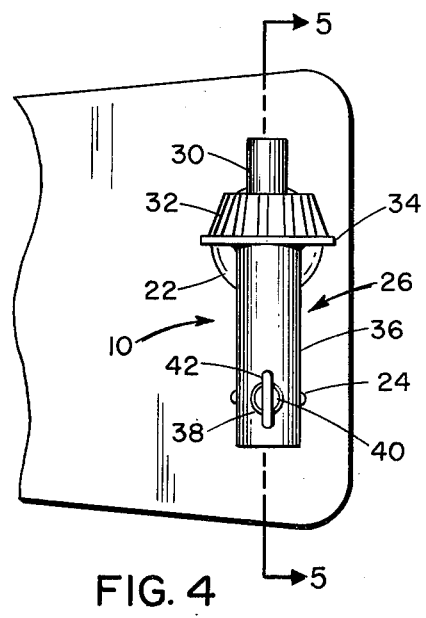
FIG. 4 is a view like FIG. 3 showing the key in place.

Referring now to FIG. 3, the pocket 20 is shown as it would appear in external view in the butt of the drill such as 10 or 16, or in any other place it may be used. The outside of the pocket 20 comprises a recess 22 of predetermined depth. The recess is circular as a matter of convenience; it may have other shapes, and it serves the purpose of locating and holding the key 10 as the key is locked and unlocked from the pocket. Other equivalent locating means could also be used. The pocket further comprises, on the outside, an opening 24 having a particular configuration dictated by the cross bar on the key 10, as will appear below. Generally, the shape of the opening 24 approximates that of a diametrical line bisecting a circle and extending out beyond the circle on both sides. More accurately, this shape is determined by the projection of the key cross bar on a plane transverse to its axis. The opening 24 serves as guide means to guide the handle of the key into the pocket. An extension of this guide means, see FIG. 6, extends all the way into the pocket to guide the key into the position from which it may be locked, as will be set forth below.

Referring now to several of the other figures, the key 10 itself comprises two main portions; the body portion 26, and the sliding cross-bar handle 28. Body 26 comprises a pilot 30, a bevel gear 32, a collar 34, a main shank 36, and a thru opening 38 in the opposite end of the shank. As is very well known, the pilot 30 and gear 32 cooperate with a formed opening and a gear in the chuck on the drill to operate the chuck. The sliding handle comprises a shank portion 40, of predetermined length, and a paddle 42 at each end of the shank. Paddles 42 as shown are integral, but an assembled handle could also be used if desired in any particular environment. The length of the shank 40 is predetermined as measured between the inside ends of the paddles. That is, the undistributed round cross-sectional part of the shank between the two paddles is important in the operation of the invention, as will appear in greater detail below. The diameter of shank 40 is a predetermined amount smaller than the diameter of opening 38, whereby the sliding handle 28 may freely move in the main body 26, and is constrained therein by the flattened paddles 42. This structure is very analogous to vise handles and handles on large clamps, and the like, and provides the same advantages of ease of manipulation, comfortable use, and simplicity of manufacture. In making the key 10, the tolerance on and the location of the opening 38 is not highly critical, and in the same manner, the diameter of shank 40, as well as the precise configuration of the paddles 42, are not critical. Both outside surfaces of the paddles 42 are preferably roughened as by being knurled or serrated in order to improve the grip of the users's fingers on the paddles as he uses the chuck key.

The configuration of the sliding handle 28 at the junction of the round cross-section shank 40, and each paddle end, as opposed to the paddle end per se, is important in the operation of the invention, as will be brought out in greater detail below.

Figure 5:
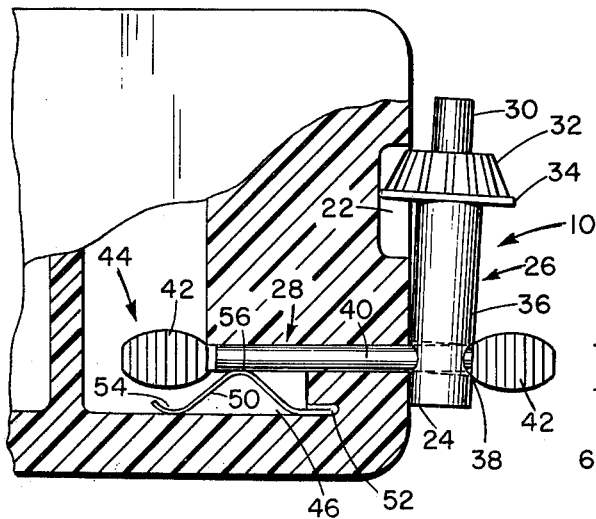
FIG. 5 is a cross-sectional view taken on line 5—5 of FIG. 4 and showing the key in elevation.
Figure 6:
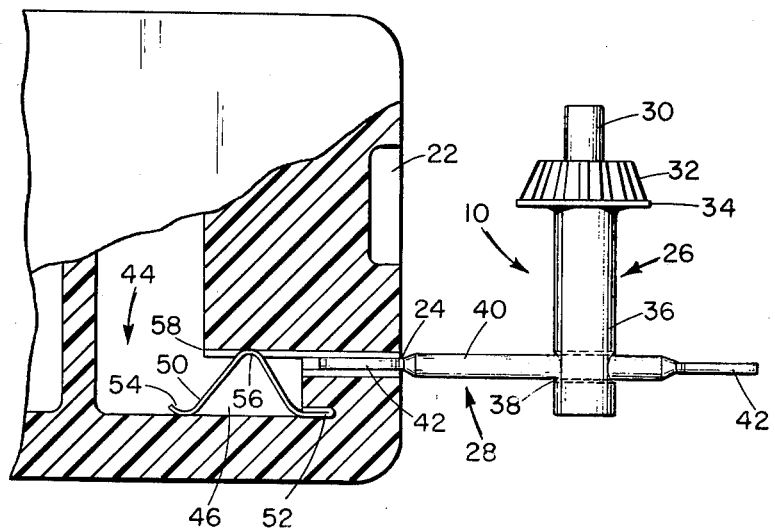
FIG. 6 is a view of the parts shown in FIG. 5 showing a key almost entirely removed.

Referring now to FIGS. 5 and 6, a first form 44 of the spring pocket of the invention is shown in detail. The pocket basically comprises a molded cavity in the support structure 48, which structure 48 can comprise the butt handle of a drill, some other location on a drill, the base of a drill press, or the like environment in which the invention could be used, as set forth above. A flat formed spring 50 is located in cavity 46, and has a generally V-configuration. Spring 50 has an anchored end 52 which is snugly received in a suitably formed recess in a wall of the base 48. The opposite free end 54 is curved upwardly so as to slide smoothly on the bottom wall of the cavity 46. The spring top end 56 is positioned to bear against the shank 40 of the sliding cross bar of the key, when the key is located inside cavity 46, as shown in FIG. 5. Opening 24 terminates at a corner 58 which partially defines the cavity 46, and which serves a function as will appear below. Other means, such as a pin or rod, could be substituted for the integral corner means 58 shown. The upper will defining the cavity 46 is formed with a part circular cutout extension of the opening 24 to accommodate the upper round part of the sliding handle shank 40.

It is significant that the line defined by corner means 58 is parallel to the plane of the paddle 42 when the paddles are inserted. To lock the key 10 in the opening, the paddle is turned 90° whereby the plane of the paddle is at right angles to this corner 58, thereby precluding removal of the key until the paddle is turned back into the parallel relationship. Then the paddle can be moved through the guide means 24 and will clear the corner 58. As shown, part of the entrance opening guide means 24 continues all the way to corner 58 for the purpose of preventing the turning of the paddle end until it clears the corner.

Figure 7:
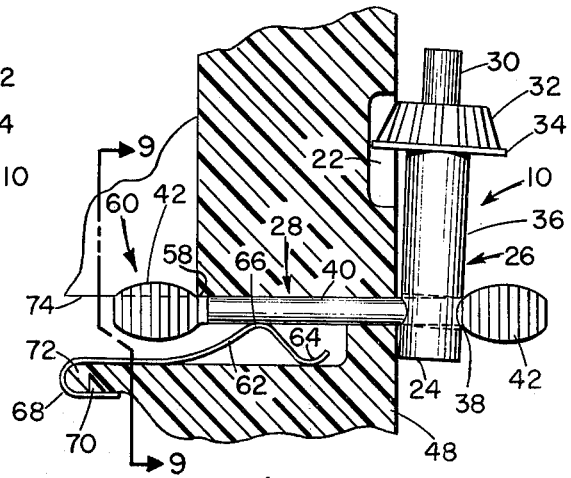
FIG. 7 is a view like FIG. 5 showing a second embodiment of the pocket.
Figure 8:
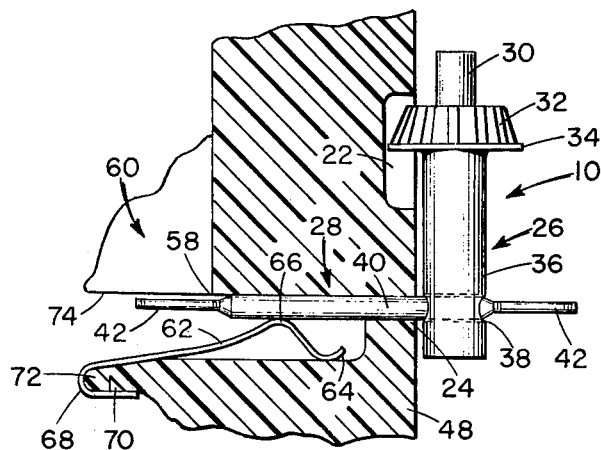
FIG. 8 is a view of the parts shown in FIG. 7 showing the key in the unlocked position.

FIGS. 7 and 8 show the same chuck key 10 used with a second form of spring pocket 60. Parts the same as described above carry the same reference numerals. The primary difference between the two embodiments is the configuration of the spring. Further, FIGS. 7 and 8 show an optional feature also useable in the pocket 20 of the previous embodiment, as well as illustrating the camming effect of the paddle and of the chuck key. The spring configuration, in turn, is dictated by the environment or base 48 in which the spring must be used. Thus, in FIGS. 5 and 6 the base lends itself to a closed cavity and thus the particular spring configuration 50. In FIGS. 7 and 8 the environment comprises a free extending ledge 72. Spring 62 comprises a free end 64, a top end 66 analogous to part 56 of spring 50, a return or bent over portion 68 which envelops the ledge 72, and finally an anchor barb 70 which grasps the material of the ledge 72. Part 70 may conveniently be formed as simply a stamped out triangular portion in the flat metal of the spring 60. Other suitable biasing means will present themselves to those skilled in the art when faced with a particular environment in which the invention spring pocket is to be used.

Means may be provided if desired to limit the rotation of the sliding handle 28 to the lock position when the handle is in the pocket. As is evident from FIGS. 5 and 6, only when the key is in the FIG. 6 position, for insertion and removal of the key, is it necessary that the paddles be positioned in line with the external opening 24. Otherwise, the handle may rotate freely about its own axis when the key is in the FIG. 5 position. This may or may not be a problem, depending upon the particular environment. However, in other situations, and where the space and means are available, it may be desirable to provide means in the pocket to indicate to the user when he is at the key locked position. To this end, in FIGS. 7 and 9 there is shown an additional internal corner 74 positioned in spaced relation to the corner 58 and at right angles thereto. That is, the straight line defining corner 58 is located coplanar with but at right angles to the straight line defining corner 74, as is clear from a comparison of FIGS. 7 and 9. Corner 74 prevents the paddle 42 from being turned beyond the locked position. The tendency and possibility of the user turning the key sliding handle and paddles in the wrong direction is precluded in that when the paddle end is inserted into the opening, it will virtually not turn at all prior to striking the underside of the corner 74. Thus, the user will get to expect and will know to turn the shank 40 approximately 90° always to the same side in order to achieve the key locked into the pocket position.

Figure 10:
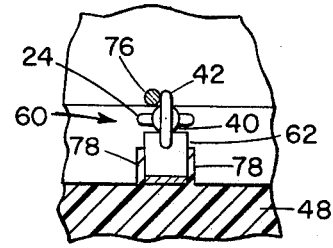
FIG. 10 is a view like FIG. 9 showing a second embodiment of one of the additional features.

FIG. 10 illustrates a modified form of the same locked position defining means. A pin 76 is positioned in the base 48 in lieu of the corner 74. The function and operation of the pin 76 is the same as described above in regard to the corner 74. It should be noted that corner 74, pin 76, or other equivalent means are positioned parallel to the axis of the handle 28.

Figure 9:
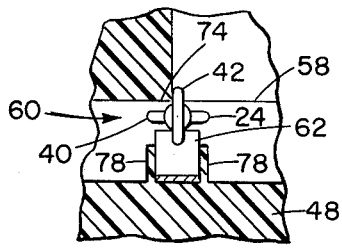
FIG. 9 is a cross-sectional view taken on line 9—9 of FIG. 7 and showing some details and other features.

Means are also provided to constrain the spring 62 against sidewise or transverse motion, which motion might otherwise preclude the proper operation of the invention pocket. To this end, as shown in FIGS. 9 and 10, a pair of integral ribs 78 may be provided in the base or substructure 48 to constrain the spring transversely. Similar such constraining means could be provided, if desired, in the first embodiment in conjunction with spring 50. In other environments, only the rib such as 78 might be needed, as is evident to those skilled in the art. The showing of the ribs has been omitted in the other FIGS. for purposes of clarity.

Means are provided to snugly lock the key into the recess 22 and against the side of the base 48, as can be seen by a comparison of FIGS. 7 and 8. A camming action is provided at both ends of the sliding shank 40 by means of the rounded corners of the paddle 42 when blend into the rounded shank 40. As best shown in FIGS. 5 and 7, the intersection section of the opening 38 diametrically across the round main shank 36 of the body 26 of the key produces an elliptical opening. This elliptical opening, produced by the geometry of the intersecting surfaces, is utilized in the invention in that the shoulders of the paddle 42, that is the widened parts just beyond the round shank 40, are positioned in the deeper part of this elliptical opening when the shank is in the inserted position. When it is desired to lock the key, the shoulders ride up on the smaller diameter of this elliptical opening in the shank 36, thus camming the chuck key 10 tightly against the base.

A similar effect is obtained, during the locking operation, by the paddle 42 at the opposite end of the shank 40 in its cooperation with the corner 58. The camming effect can readily be appreciated by an examination of FIGS. 7 and 8. Thus, it can be seen that the length of the shank 40 between the paddles 42 is important and must be made to correspond to the distance from between the corner 58 and the outside of the base 48, so that the key will be cammed and locked tightly into position.

While the invention has been described in detail above, it is to be understood that this detailed description is by way of example only, and the protection granted is to be limited only within the spirit of the invention and the scope of the following claims.

We claim:

1. An electric drill and a chuck key for use with the chuck on said drill, said chuck key comprising a shank portion having gear means at one end and a thru opening at the opposite end, a handle slidingly received in said thru opening, paddle means formed at each end of said sliding handle, a pocket formed in the housing of said drill for mounting said chuck key sliding handle therein, said pocket comprising guide means having a predetermined shape corresponding to the projection of said handle and a paddle perpendicular to the axis of said handle, said guide means terminating at corner means inside said housing of said drill, whereby said handle may be located in said pocket by turning said paddle after said paddle has been inserted beyond said guide means approximately 90° about the axis of said handle to cause said paddle to contact said corner means.

2. The combination of claim 1, and locating means formed in said housing of said drill in the outside surface thereof in spaced relation to the entrance of said guide means, said locating means being cooperable with the gear portion of said chuck key, whereby said chuck key gear portion and shank are held against rotation by said locating means when said handle is turned about its axis to contact said corner means.

3. The combination of claim 2, said locating means comprising a molded circular recess.

4. The combination of claim 1, said handle and paddle means comprising a cylindrical cross-section shank portion of predetermined length and an integral flattened paddle at each end of said shank.

5. The combination of claim 1, and spring means for biasing said handle against said corner means said handle is in said pocket.

6. The combination of claim 5, said spring means comprising a formed flat spring having an anchored end, a free end, and an intermediate portion for contacting said handle.

7. The combination of claim 6, and at least one integral rib formed in said tool casing and adapted to prevent said formed flat spring free end from moving transversely to the axis of said chuck key handle.

8. The combinations of claim 1, and stop means in predetermined spaced relation to said corner means and adapted to be contacted by said paddle means after said paddle means are inserted in said opening beyond said corner means.

9. In combination, a chuck key for a portable electric tool including a body having an elongated sliding handle slidable along and rotatable about a longitudinal axis of said handle relative to said body, paddle means at each end of said sliding handle; pocket means formed in a structure for mounting said chuck key on said structure, said pocket means comprising guiding means having an opening having a shape corresponding to the projection of said handle and said paddle means on a plane perpendicular to the axis of said handle; first corner means formed in said pocket means for engaging one of said paddle means when said handle is inserted into said opening and rotated from a first position aligned with said opening to a second position out of alignment with said opening whereby said handle is held in said opening and cannot be withdrawn from said opening while in said second position; second corner means for laterally engaging said one paddle means to prevent said handle from being rotated beyond said second position thereby ensuring that said handle is in said second position when said handle is rotated into said second position; and, cam locking means integral with said body for coacting with said other paddle means for tightly holding said handle between said first corner means and said body when said handle is rotated into said second position whereby said body is held against said structure.

10. The combination of claim 9, and spring means for biasing said handle against said corner means when said handle is in said pocket.

11. In combination, a chuck key having a sliding handle, paddle means at each end of said sliding handle, a portable electric tools having a pocket for mounting said chuck key comprising guiding means having an opening having a shape corresponding to the projection of said handle and a paddle on a plane perpendicular to the axis of said handle, said opening terminating at corner means adapted to be contacted by a paddle when said paddle is in said opening, whereby said handle is locked in said opening by turning said paddle approximately 90° about the axis of said handle out of the plane in which said paddle is located by said guiding means to cause said paddle to contact said corner means and lock said item in said pocket, said chuck key comprising a mating shank, a transverse opening in said shank to slidingly receive said handle, said shank being of cylindrical configuration, whereby the intersection of said handle opening and said shank is of elliptical configuration, said handle being of circular cross-section, said paddle portions being integrally formed on each end of said shank and comprising shoulder portion, whereby turning of said handle in said shank opening will cause said shoulder portions to ride up on the edges of said elliptical opening to cause relative motion between said handle and said chuck key shank along the axis of said handle.

12. In combination, a chuck key for a portable electric tool including a body having an elongated sliding handle of predetermined length slidable along and rotatable about a longitudinal axis of said handle relative to said body, paddle means at each end of said sliding handle, pocket means formed in the structure of the portable electric tool for mounting said chuck key on said structure, said pocket means comprising guiding means having an elongated opening having a shape corresponding to the projection of said handle and said paddle means on a plane perpendicular to the axis of said handle; first corner means formed on said pocket means for engaging one of said paddle means when said handle is inserted into said opening and rotated from a first position aligned with said opening to a second position out of alignment with said opening whereby said handle is held in said opening and cannot be withdrawn from said opening while in said second position; said first corner means extending transverse of said opening and spaced from the entrance to said opening a distance substantially equal to the distance between said body and said one paddle means when the other one of said paddle means is in contact with said body thereby causing the body to be held against said structure when said handle is in said second position; second corner means for laterally engaging said one paddle means to prevent said handle from being rotated beyond said second position thereby ensuring that said handle is in said second position when said handle is rotated into said second position; and, cam locking means integral with said body for coacting with the other paddle means for tightly holding said handle between said first corner means and said body when said handle is rotated into said second position whereby said body is held against said structure.

13. In combination, a chuck key for a portable electric tool including a body having an elongated sliding handle slidable along and rotatable about a longitudinal axis of said handle relative to said body, paddle means at each end of said sliding handle, pocket means for mounting said chuck key comprising guiding means having an opening having a shape corresponding to the projection of said handle and paddle means on a plane perpendicular to the axis of said handle, first corner means arranged in said pocket means for engaging the edge of one of said paddle means when said handle is inserted into said opening and rotated from a first position aligned with said opening to a second position out of alignment with said opening whereby said handle is held in said opening and cannot be withdrawn from said opening while in said second position; second corner means for laterally engaging a flat side of said one paddle means to prevent said handle from being rotated beyond said second position thereby ensuring that said handle is in said second position when said handle is rotated into said second position from said first position; and, cam locking means integral with said body for coacting with the other paddle means for tightly holding said handle between said first corner means and said body when said handle is rotated into said second position whereby said body is held against said structure.

14. In combination, a chuck key for a portable electric tool, the key including a body having an elongated sliding handle slidable along and turnable about a longitudinal axis of said handle relative to said body, paddle means at each end of said sliding handle, pocket means formed in the portable electric tool for mounting said chuck key comprising guiding means having an opening having a shape corresponding to the projection of said handle and said paddle means on a plane perpendicular to the axis of said handle, transverse first and second corner means in said pocket adapted to be contacted by one of said paddle means when said one paddle means is inserted in said opening and rotated from a first position aligned with said opening to a second position out of alignment with said opening, said first corner means preventing said handle from being withdrawn from said opening, said second corner means preventing said handle from being rotated beyond said second position, whereby said handle is locked in said opening by turning said paddle means from said first position to said second position about the axis of said handle out of the plane in which said paddle means is located by said guiding means to cause said paddle means to contact said first corner means and lock said chuck key in said pocket; and, cam locking means integral with said body for coacting with the other paddle means for tightly holding said handle between said first corner means and said body when said handle is rotated into said second position whereby said body is held against said structure.

15. The combination of claim 14, said tool comprising a cordless battery operated drill, said drill being of the pistol grip variety, and said pocket being formed in the butt end of said drill.

16. The combination of claim 14, said tool comprising a corded electric drill, said drill being of the pistol grip variety and said pocket being formed in the butt end of said drill.

17. The combination of claim 14, and spring means for biasing said handle against said corner means when said handle is in said pocket.

18. In combination, a chuck key for a portable electric tool, the key including a body having an elongated sliding handle slidable along and turnable about a longitudinal axis of said handle relative to said body, paddle means at each end of said sliding handle, pocket means formed in the portable electric tool for mounting said chuck key comprising guiding means having an opening having a shape corresponding to the projection of said handle and said paddle means on a plane perpendicular to the axis pocket adapted transverse first and second corner means in said pocket adapted to be contacted by one of said paddle means when said one paddle means is inserted in said opening and rotated from a first position aligned with said opening to a second position out of alignment with said opening, said first corner means preventing said handle from being withdrawn from said opening, said second corner means preventing said handle from being rotated beyond said second position, whereby said handle is locked in said opening by turning said paddle means from said first position to said second position about the axis of said handle out of the plane in which said paddle means is located by said guiding means to cause said paddle means to contact said first corner means and lock said item in said pocket, and spring means for biasing said handle against said corner means when said handle is in said pocket, said spring means comprising a formed flat spring having an anchored end, a free end, and an intermediate portion for contacting said handle.

19. In combination, an item including a body having an elongated sliding handle slidable along and turnable about a longitudinal axis of said handle relative to said body, paddle means at each end of said sliding handle, a pocket for mounting said item comprising guiding means having an opening having a shape corresponding to the projection of said handle and a paddle on a plane perpendicular to the axis of said handle, transverse first and second corner means in said pocket adapted to be contacted by a paddle when said paddle is inserted in said opening and turned from a first position aligned with said opening to a second position out of alignment with said opening, said first corner means preventing said handle from being withdrawn from said opening, said second corner means preventing said handle from being turned beyond said second position, whereby said handle is locked in said opening by turning said paddle from said first position to said second position about the axis of said handle out of the plane in which said paddle is located by said guiding means to cause said paddle to contact said first corner means and lock said item in said pocket, and spring means for biasing said handle against said corner means when said handle is in said pocket, said spring means comprising a formed flat spring having an anchored end, a free end, and an intermediate portion for contacting said handle, a base member in which said pocket is located, said base member comprising a free ledge, said spring anchored end comprising a return bend portion to envelope said free ledge, and anchoring means in said return bend portion operatively cooperable with said free ledge.

20. In combination, an item including a body having an elongated sliding handle slidable along and turnable about a longitudinal axis of said handle relative to said body, paddle means at each end of said sliding handle, a pocket for mounting said item comprising guiding means having an opening having a shape cooresponding to the projection of said handle and a paddle on a plane perpendicular to the axis of said handle, transverse first and second corner means in said pocket adapted to be contacted by a paddle when said paddle is inserted in said opening and turned from a first position aligned with said opening to a second position out of alignment with said opening, said first corner means preventing said handle from being withdrawn from said opening, said second corner means preventing said handle from being turned beyond said second position, whereby said handle is locked in said opening by turning said paddle from said first position to said second position about the axis of said handle out of the plane in which said paddle is located by said guiding means to cause said paddle to contact said first corner means and lock said item in said pocket, spring means for biasing said handle aginst said corner means when said handle is in said pocket, said spring means comprising a formed flat spring having an anchored end, a free end, and an intermediate portion for contacting said handle, and a base member containing said pocket, a cavity in said base member containing said formed flat spring, said spring being a V-configuration, said free and anchored ends being coplanar in said cavity, and said intermediate portion being located between said entrance opening and said corner means.

21. In combination, an item including a body having an elongated sliding handle slidable along and turnable about a longitudinal axis of said handle relative to said body, paddle means at each end of said sliding handle, a pocket for mounting said item comprising guiding means having an opening having a shape corresponding to the projection of said handle and a paddle on a plane perpendicular to the axis of said handle, transverse first and second corner means in said pocket adapted to be contacted by a paddle when said paddle is inserted in said opening and turned from a first position aligned with said opening to a second position out of alignment with said opening, said first corner means preventing said handle from being withdrawn from said opening, said second corner means preventing said handle from being turned beyond said second position, whereby said handle is locked in said opening by turning said paddle from said first position to said second position about the axis of said handle out of the plane in which said paddle is located by said guiding means to cause said paddle to contact said first corner means and lock said item in said pocket, spring means for biasing said handle against said corner means when said handle is in said pocket, said spring means comprising a formed flat spring having an anchored end, a free end, and an intermediate portion for contacting said handle, said pocket being in a base member, and rib means on said base member operatively cooperable with said formed flat spring free end to constrain said free end against motion transverse to the axis of said handle.

22. In combination, a chuck key for a portable electric tool including a body having an elongated sliding handle of predetermined length slidable along and turnable about a longitudinal axis of said handle relative to said body, paddle means at each end of said sliding handle, a pocket for mounting said chuck key comprising guiding means having an elongated opening having a shape corresponding to the projection of said handle and said paddle means on a plane perpendicular to the axis of said handle, transverse first and second corner means in said pocket adapted to be connected by one of said paddle means when said one paddle means is inserted in said opening and turned from a first position aligned with said opening to a second position out of alignment with said opening, said first corner means extending transverse of said opening and spaced from the entrance to said opening a distance substantially equal to the distance between said body and said inserted one paddle means, said first corner means preventing said handle from being withdrawn from said opening, said second corner means preventing said handle from being turned beyond said second position, whereby said handle is locked in said opening by turning said handle from said first position to said second position about the axis of said handle out of the plane on which said one paddle means is located by said guiding means to cause said one paddle means to contact said first corner means and lock said item in said pocket, said pocket being in a base member, said corner means comprising integral corner portions formed in said base member and being coplanar and at right angles to each other; and, cam locking means integral with said body for coacting with the other paddle means for tightly holding said handle between said first corner means and said body when said handle is rotated into said second position whereby said body is held against said structure.

23. In combination, an item including a body having an elongated sliding handle of predetermined length slidably along and turnable about a longitudinal axis of said handle relative to said body, paddle means at each end of said sliding handle, a pocket for mounting said item comprising guiding means having an elongated opening having a shape corresponding to the projection of said handle and a paddle on a plane perpendicular to the axis of said handle, transverse corner means in said pocket adapted to be contacted by a paddle when said paddle is inserted in said opening and turned from a first position aligned with said opening to a second position out of alignment with said opening, said corner means extending transverse of said opening and spaced from the entrance to said opening a distance substantially equal to the distance between said item body and said inserted paddle, said corner means preventing said handle from being withdrawn from said opening, and stop means preventing said handle from being turned beyond said second position, whereby said handle is locked in said opening by turning said paddle from said first position to said second position about the axis of said handle out of the plane on which said paddle is located by said guiding means to cause said paddle to contact said first corner means and lock said item in said pocket, said pocket being located in a base member, said stop means comprising a pin member fitted in said base member and disposed parallel to the axis of said handle when said handle is in said pocket.

24. In combination, an item including a body having an elongated sliding handle slidable along and rotatable about a longitudinal axis of said handle relative to said body, paddle means at each end of said sliding handle; pocket means formed in a structure for mounting said item on said structure, said pocket means comprising guiding means having an opening having a shape corresponding to the projection of said handle and said paddle means on a plane perpendicular to the axis of said handle; first corner means formed in said pocket means for engaging one of said paddle means when said handle is inserted into said opening and rotated from a first position aligned with said opening to a second position out of alignment with said opening whereby said handle is held in said opening and cannot be withdrawn from said opening while in said second position; second corner means for laterally engaging said one paddle means to prevent said handle from being rotated beyond said second position thereby ensuring that said handle is in said second position when said handle is rotated into said second position; locking means formed on said body for coacting with said other paddle means for tightly holding said handle between said first corner means and said body when said handle is rotated into said second position whereby said body is held against said structure; and, spring means for biasing said handle against said corner means when said handle is in said pocket, said spring means comprising a formed flat spring having an anchored end, a free end, and an intermediate portion for contacting said handle.

* * * * *